(12) United States Patent
Arndt

(10) Patent No.: US 10,399,171 B2
(45) Date of Patent: Sep. 3, 2019

(54) SYSTEMS AND METHODS FOR CUTTING A PLOW BOLT HOLE WITH A CUTTING TORCH

(71) Applicant: Messer Cutting Systems Inc., Menomonee Falls, WI (US)

(72) Inventor: Dan Arndt, Winter Haven, FL (US)

(73) Assignee: Messer Cutting Systems Inc., Menomonee Falls, WI (US)

( * ) Notice: Subject to any disclaimer, the term of this patent is extended or adjusted under 35 U.S.C. 154(b) by 609 days.

(21) Appl. No.: 15/006,324

(22) Filed: Jan. 26, 2016

(65) Prior Publication Data

US 2016/0221099 A1   Aug. 4, 2016

Related U.S. Application Data

(60) Provisional application No. 62/109,372, filed on Jan. 29, 2015.

(51) Int. Cl.
*B23K 7/00* (2006.01)
*B23K 7/10* (2006.01)
(Continued)

(52) U.S. Cl.
CPC .............. *B23K 7/102* (2013.01); *B23K 7/002* (2013.01); *B23K 10/006* (2013.01);
(Continued)

(58) Field of Classification Search
CPC ... B23K 7/102; B23K 7/002; G05B 19/40935
See application file for complete search history.

(56) References Cited

U.S. PATENT DOCUMENTS

| 4,256,288 A | 3/1981 | Rojas |
| 5,043,553 A | 8/1991 | Corfe et al. |

(Continued)

FOREIGN PATENT DOCUMENTS

| AU | 198279428 A | 7/1983 |
| CN | 103722291 A | 4/2014 |
| WO | 2009036464 A3 | 3/2009 |

OTHER PUBLICATIONS

StakoJesco, . Novum Bevel Countersink True Hole Cutting. YouTube, YouTube, Oct. 16, 2012, www.youtube.com/watch?v=d0DMilT3Wn8. (Year: 2012).*

(Continued)

*Primary Examiner* — Colleen P Dunn
*Assistant Examiner* — Jeremy C Jones
(74) *Attorney, Agent, or Firm* — Andrus Intellectual Property Law, LLP

(57) ABSTRACT

A method for cutting a plow bolt hole in a work piece using a cutting torch includes receiving a computerized part file including elements representing holes to be cut in the work piece. An element is selected and assigned a plow bolt hole identity. The selected element is associated with an aspect of an inner shape and an aspect of an outer shape of the plow bolt hole. A tool path is developed for the cutting torch that accounts for the aspect of the inner shape and the aspect of the outer shape and is associated with the selected element. Instructions are output to a computer numerical control (CNC) machine to move the cutting torch along the tool path so as to cut both the inner shape and the outer shape of the plow bolt hole in the work piece consecutively without interrupting a flame of the torch.

15 Claims, 5 Drawing Sheets

(51) Int. Cl.
 *B23K 10/00* (2006.01)
 *G05B 19/4093* (2006.01)

(52) U.S. Cl.
 CPC ............ *G05B 19/40935* (2013.01); *G05B 2219/45044* (2013.01); *G05B 2219/49335* (2013.01); *Y02P 90/265* (2015.11)

(56) References Cited

U.S. PATENT DOCUMENTS

| | | | |
|---|---|---|---|
| 6,764,640 | B1 | 7/2004 | Talkington et al. |
| 7,019,257 | B2 | 3/2006 | Stevens |
| 7,919,724 | B2 | 4/2011 | Huang et al. |
| 8,119,949 | B2 | 2/2012 | Frye |
| 8,195,310 | B2 | 6/2012 | Ould et al. |
| 8,286,236 | B2 | 10/2012 | Jung et al. |
| 8,309,205 | B2 | 11/2012 | Nelissen et al. |
| 8,338,745 | B2 | 12/2012 | Liu |
| 8,340,807 | B1 | 12/2012 | Rodrigue et al. |
| 8,378,250 | B2 | 2/2013 | Flaig et al. |
| 8,525,067 | B2 | 9/2013 | Muscat-Tyler et al. |
| 8,525,074 | B2 | 9/2013 | Fukushima et al. |
| 8,631,557 | B2 | 1/2014 | Elfizy et al. |
| 8,779,325 | B2 | 7/2014 | Nomaru et al. |
| 8,969,759 | B2 | 3/2015 | Humphreys |
| 8,987,636 | B2 | 3/2015 | Fagan |
| 9,002,501 | B1 | 4/2015 | Rodrigue et al. |
| 9,040,871 | B2 | 5/2015 | Munzer et al. |
| 2006/0064198 | A1* | 3/2006 | Fithian ............ G05B 19/40935 700/187 |
| 2007/0148567 | A1 | 6/2007 | Ferber |
| 2007/0201002 | A1* | 8/2007 | Takeichi ............ B24B 9/148 351/178 |
| 2011/0036819 | A1 | 2/2011 | Munzer et al. |
| 2014/0236339 | A1 | 8/2014 | Fagan |
| 2015/0129563 | A1 | 5/2015 | Hodges et al. |

OTHER PUBLICATIONS

Messer Cutting Systems GMBH, OmniBevel 2015, Brochure, available Oct. 2014.

Messer Cutting Systems Inc., Plow Bolt Process—Messer Cutting Systems, YouTube Video, Mar. 15, 2013.

Sigmatek Systems, LLC, SigmaNEST Software, Brochure, available Dec. 2014.

Torchmate, Torchmate CAD/CAM, www.torchmate.com/member/108/, website visited on Aug. 24, 2015.

* cited by examiner

10,399,171 B2

SYSTEMS AND METHODS FOR CUTTING A PLOW BOLT HOLE WITH A CUTTING TORCH

CROSS-REFERENCE TO RELATED APPLICATION

The present application claims the benefit of U.S. Provisional Application Ser. No. 62/109,372, filed Jan. 29, 2015, which is hereby incorporated by reference herein.

FIELD

The present disclosure relates to computer numerical control (CNC) machines for performing plasma arc cutting and/or oxy fuel cutting. The present disclosure more specifically relates to a system and method for programming and moving a cutting torch (tool) to cut a plow bolt hole in a work piece.

BACKGROUND

U.S. Pat. No. 8,195,310 discloses a machine tool program editor used to insert auxiliary operations e.g. measurement, process control and program logic into a CNC work producing program. The editor has representations of the operations which can be placed in the correct position in the program. User input in the form of parameters is prompted when a representation is selected. The program is post processed and run on a machine tool whereat the operations are performed.

U.S. Pat. No. 8,378,250 discloses a bevel head attachment including a rotation axis normal to a cutting plane and a rotary assembly having cylindrical inner and outer barrels and a bevel arm. The bevel arm carries a tilt arm having a torch clamp. The tilt arm rotates about a tilt axis forming an acute angle with the rotation axis. A rotation drive motor operable to rotate the bevel arm about the rotation axis and a tilt drive motor operable to rotate the tilt arm about the tilt axis are located remotely from the torch clamp. The tilt drive motor is connected to the tilt arm through the outer barrel. The motors are commanded according to only two transformation equations to rotate a torch held by the tilt arm about the rotation and tilt axes to achieve planer tilt adjustment. The lightweight attachment provides unlimited rotation, and locates sensitive electronic elements away from the torch.

U.S. Pat. No. 8,525,067 discloses a process for the jet cutting of arcuate openings in a metal workpiece such as steel, by means of creating a jet along a predetermined axis, applying the jet to the workpiece, with the axis of the jet offset from the perpendicular, and rotating the jet around to describe the arc desired while maintaining the non perpendicular axis and terminating the cutting path just prior to completion of the opening.

U.S. Pat. No. 8,987,636 discloses systems, methods and software products for generating multi-pass contours for controlling a numerical control (NC) machine to cut out a part with weld preparation. Weld preparation information is combined with an electronic description of the part to form an enhanced electronic file. Multi-pass contours, usable to control an NC machine to cut out the part with at least one bevel, are generated based upon the enhanced electronic file.

U.S. Patent Application Publication No. 2015/0129563 discloses systems and methods of using a plasma arc torch to cut holes and contours in workpieces having varying thickness and material properties. The systems and methods of the present invention allow for the cutting of holes and contours without the need for using secondary processing by using particular overburn, tail out and/or cutting parameters.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a method for cutting a plow bolt hole in a work piece using a cutting torch includes receiving a computerized part file including a plurality of elements representing holes to be cut in the work piece. The method includes selecting an element from the plurality of elements in the part file and assigning a plow bolt hole identity to the selected element. With a processor, the selected element is associated with an aspect of an inner shape of the plow bolt hole and an aspect of an outer shape of the plow bolt hole, wherein the outer shape circumscribes the inner shape. With the processor, a tool path is developed for the cutting torch that accounts for the aspect of the inner shape and the aspect of the outer shape, and the tool path is associated with the selected element. The method includes outputting instructions to a computer numerical control (CNC) machine to move the cutting torch along the tool path so as to cut both the inner shape and the outer shape of the plow bolt hole in the work piece consecutively without interrupting a flame of the torch.

According to another example of the present disclosure, a non-transitory computer readable medium is disclosed. The non-transitory computer readable medium has computer executable instructions stored thereon executed by a processor to perform a method of analyzing a computerized part file including a plurality of elements representing holes to be cut in a work piece. The method includes selecting an element from the plurality of elements in the part file and assigning a plow bolt hole identity to the selected element. The selected element is associated with an aspect of an inner shape of a plow bolt hole to be cut in the work piece and an aspect of an outer shape of the plow bolt hole, wherein the outer shape circumscribes the inner shape. A tool path is developed for a cutting torch that accounts for the aspect of the inner shape and the aspect of the outer shape, and the tool path is associated with the selected element. The method includes outputting instructions for a computer numerical control (CNC) machine to move the cutting torch along the tool path so as to cut both the inner shape and the outer shape of the plow bolt hole in the work piece consecutively without interrupting a flame of the torch.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

Figure 4:
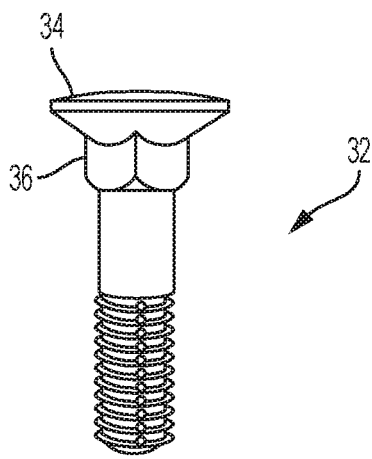
FIG. 4 illustrates one example of a plow bolt.

A plow bolt is a type of fastener that is used for making mechanical connections that require a flush surface at the location of the bolt head. Generally, plow bolts (32, FIG. 4) have a frusto-conical head 34 that slopes toward a square neck portion 36. A plow bolt hole (38, FIGS. 5 and 6), in turn, has a square portion 40 near the back side 43 of the part 44 into which the plow bolt 32 is to be inserted, and a conical portion 42 at the front side 41 of the part 44 into which the plow bolt 32 is to be inserted. The square neck portion 36 of the plow bolt 32 engages the square portion 40 of the hole 38 formed in the part 44, and the conical head 34 of the bolt 32 engages the conical portion 42 of the hole 38 in the part 44. The square portions 36, 40 keep the bolt 32 from turning when tightening or loosening a nut on the end of the bolt 32, and the conical portions 34, 42 together provide a close-fitting seat for the bolt head, such that it is flush with the surface of the part 44. One example of a plow bolt situated in a plow bolt hole can be found in U.S. Pat. No. 3,176,808, which is incorporated herein by reference.

Typically, a plow bolt hole is cut in a part (work piece) in two separate steps: first, a torch is used to cut the square portion 40; then the torch is turned off, readjusted, re-ignited, and tilted to cut on an angle around the square portion 40 to create the conical portion 42. This process is time consuming, as it requires turning off the torch, re-adjusting its position, and re-igniting it. In contrast, according to the present disclosure, a method is provided for first, recognizing a plow bolt hole in a drawing imported from a computer automated drafting program; and second, for cutting the plow bolt hole without needing to readjust the position of the torch or turn off the torch between cutting the square portion and the conical portion of the hole. This saves time during both the programming and cutting steps, which is helpful when a number of plow bolt holes are to be cut in one work piece.

Figure 2:
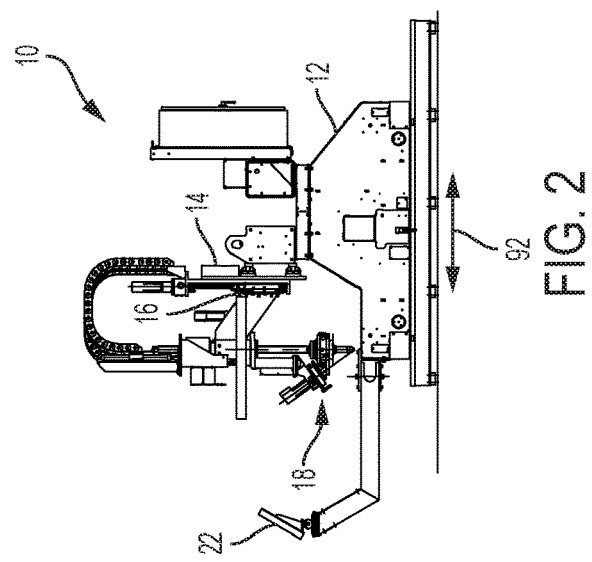
FIG. 2 is a side view thereof.
Figure 1:
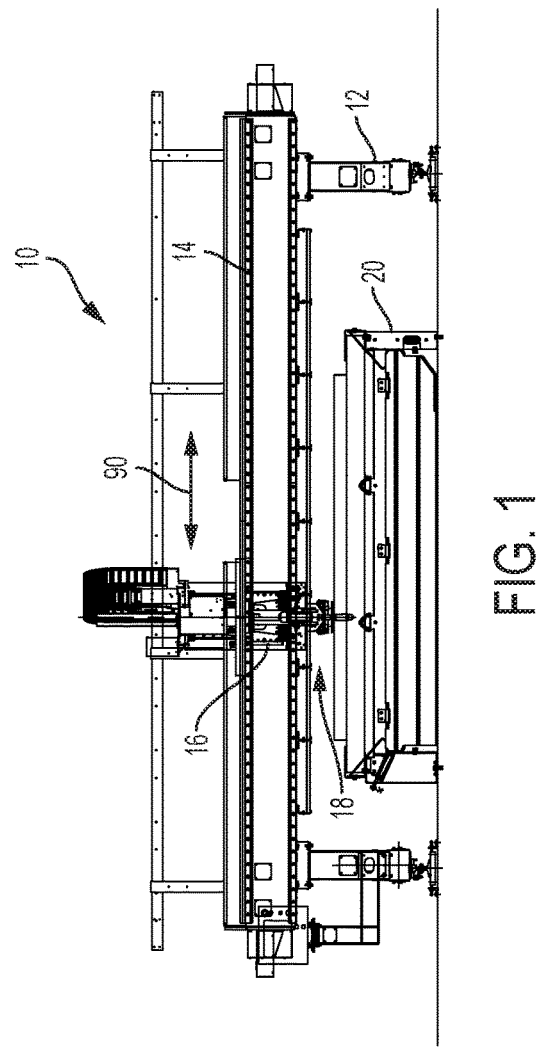
FIG. 1 is a front view of a cutting system.

FIG. 1 illustrates a cutting system 10 for carrying out the presently disclosed method. The cutting system 10 includes a frame 12 having a carriage 14 that allows a mounting plate 16 of a tool assembly 18 to move in the direction of a Y-axis 90 as indicated in the figure along the carriage 14. In the example shown, the tool assembly 18 is a bevel head tool assembly that allows the tool assembly 18 to rotate to create a beveled cut, as will be further described herein below. The frame 12 and carriage 14 hold the tool assembly 18 above a table 20 that holds a work piece (not shown). FIG. 2 shows how the cutting system 10 includes a controller 22 that directs the tool assembly 18 to move along the carriage 14 in the Y-axis 90 direction by way of the mounting plate 16, as well as directs movement along an X-axis 92 and rotation around other axes as will be described further herein below. The cutting system 10 is a computer numerical control (CNC) machine whose actions are directed by numerical control from the controller 22, which interprets a computer-aided manufacturing (CAM) file to command the tool assembly 18 where to move and when and how to cut, as is known.

In one example, the controller 22 includes a memory, a programmable processor, and programmable input/output peripherals. As is conventional, the processor can be communicatively connected to a computer readable medium that includes volatile or nonvolatile memory upon which computer readable code is stored. The processor can access the computer readable code, and the computer readable medium upon executing the code carries out cutting functions as described herein below.

Figure 3C:
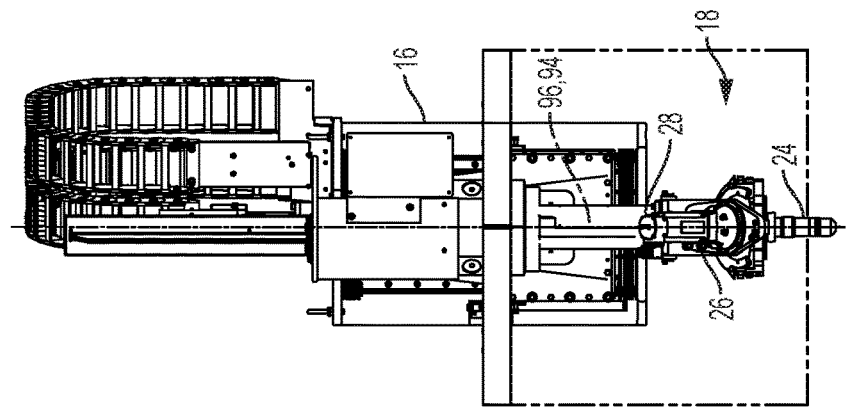
FIG. 3C is a front view thereof.
Figure 3B:
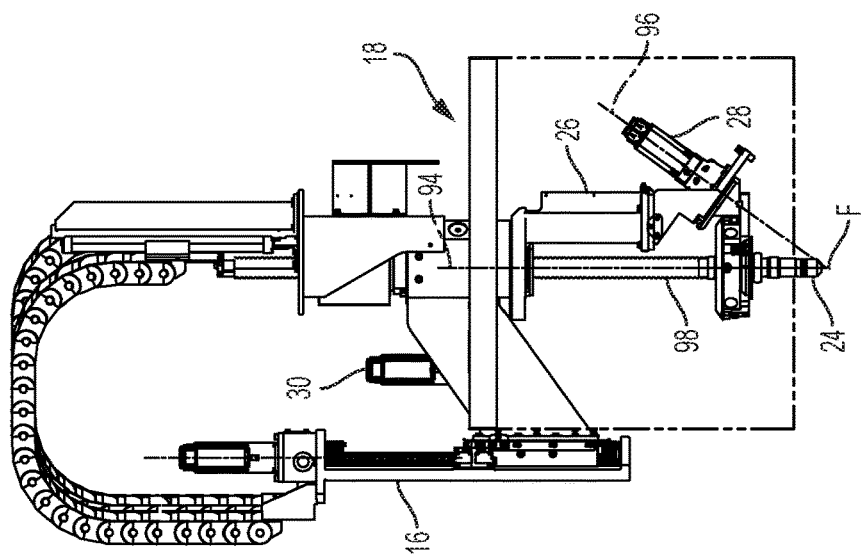
FIG. 3B is a side view thereof.
Figure 3A:
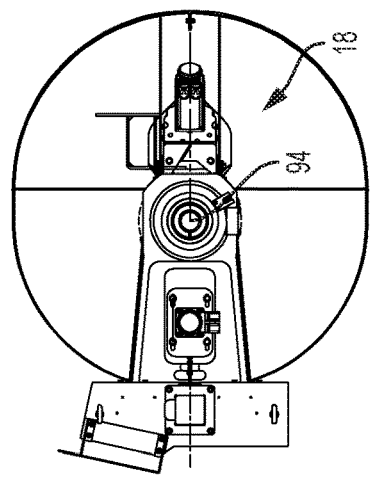
FIG. 3A is a top view of a tool assembly.

FIG. 3A shows a top view of the tool assembly 18, and notes an orientation of a C-axis 94 which extends in a generally vertical direction through the tool assembly 18. As shown in FIG. 3B, when the torch 24 is in a vertical up and down position, the torch axis 98 is aligned with the C-axis 94. A C-axis motor 30 provides rotation of the torch 24 and torch axis 98 around the C-axis 94. The torch 24 (and torch axis 98) can additionally or alternatively be rotated by a bevel head assembly 26 around an A-axis 96. The A-axis 96 is also called the tilt axis, and a tilt motor 28 controls rotation of the torch 24 and torch axis around the A-axis 96. According to the present system, both rotation around A-axis 96 and the C-axis 94 can be accomplished at the same time to create a beveled-edge cut.

FIG. 3C shows a side view of the tool assembly 18, and shows how the A-axis 96 and C-axis 94 are in fact in the same plane as one another. This allows the torch 24 to be rotated around both the A-axis 96 and the C-axis 94 to create a beveled cut without the need to lift the torch 24 from its focal point F. Thus, the cutting torch 24 of the present disclosure is moveable along horizontal X- and Y-axes 92, 90 that are perpendicular to one another, rotatable around a vertical C-axis 94, and rotatable around an A-axis 96 that is angled with respect to the C-axis 94 and with respect to the X- and Y-axes 92, 90. The A-axis 96 is in the same plane as the C-axis 94 and intersects the C-axis 94 at a focal point F of the cutting torch 24.

Figure 5:
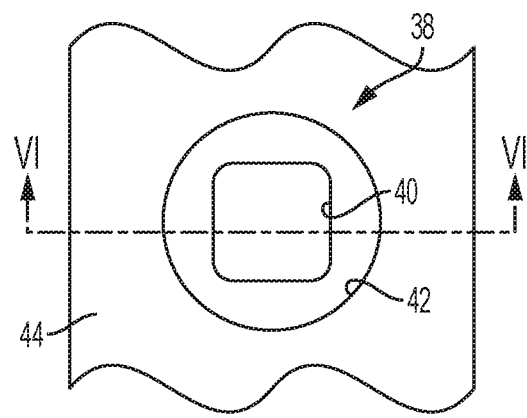
FIG. 5 illustrates one example of a plow bolt hole, viewed from above.

As described above, FIG. 4 illustrates one example of a plow bolt 32. The plow bolt 32 has a conical head 34 and a square neck portion 36. FIG. 5 illustrates a plow bolt hole 38 in a portion of a work piece 44, as viewed from above. The plow bolt hole 38 has a square portion 40 and a conical portion 42. Although the plow bolt 32 in FIG. 4 and the plow bolt hole 38 in FIG. 5 are not scaled proportionate to one another, as mentioned above, the square neck portion 36 of the plow bolt 32 fits in the square portion 40 of the hole 38, while the conical head 34 sits in the conical portion 42 of the hole 38. How this works is apparent from FIG. 6, which shows a cross section of the plow bolt hole 38 of FIG. 5 along the line VI-VI. Note that the exact configuration of the plow bolt 32 and plow bolt hole 38 shown herein are merely exemplary, and many other configurations could exist. For example, in order to get the bolt to sit flat, the square might need to be adjusted left or right of center such that the square portion 40 is offset from the conical portion 42. Alternatively or additionally, the square portion 40 could be rectangular rather than square. The relative sizes of the square and conical portions could be different, as well as the relative depth of the square portion 40 of the hole 38 with respect to the conical portion 42 of the hole 38. The angle of the conical portion could also vary from that shown herein. Additionally, although the corners of the square portion 40 of the hole 38 are shown as being slightly rounded, they could in fact be more rectangular depending on the type of torch used and the metal being cut.

Figure 6:
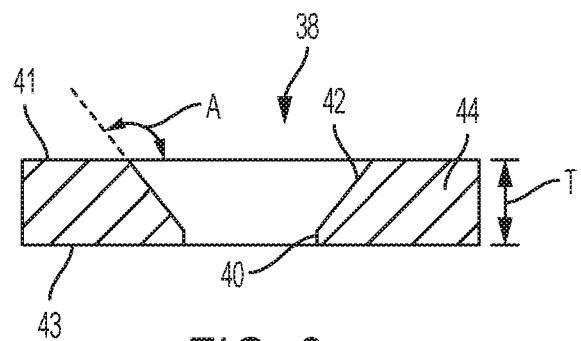
FIG. 6 illustrates the plow bolt hole of FIG. 5, when viewed in cross section.
Figure 7:
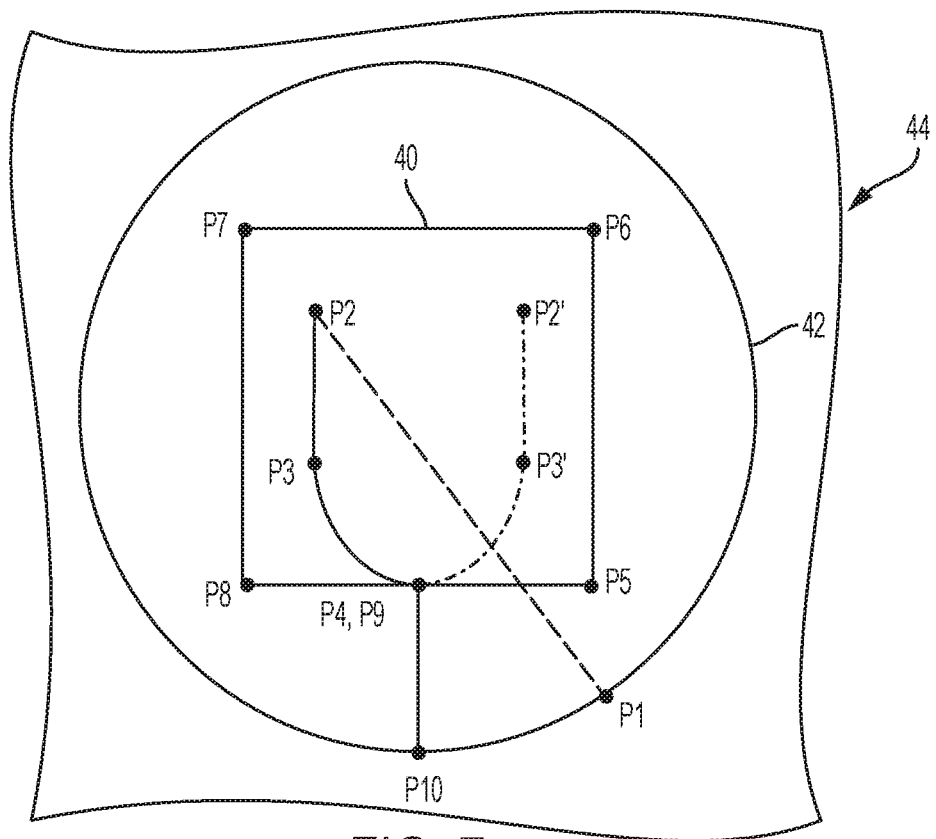
FIG. 7 is a schematic used to illustrate movement of a cutting torch while cutting a plow bolt hole.

FIG. 7 illustrates a cut path for a cutting tool (e.g., torch 24 in FIGS. 1-3) when the cutting tool is cutting a plow bolt hole (e.g., hole 38 in FIGS. 5 and 6). FIG. 7 will be used to describe both prior methods for cutting a plow bolt hole, as well as the method of the present disclosure.

According to prior methods, a part is created in a computer automated drafting (CAD) program. A circle is drawn in the part, and a square is drawn inside the circle, representing the plow bolt. A tool path is assigned by offsetting the cut path from the bottom geometry within the nesting software. For each square of a plow bolt hole, the cut direction is modified to be counter clockwise. Each circle that is beveled for a plow bolt hole then has a bevel type and angle applied to it. The program is then sent to the controller 22, the operator loads the part program at the CNC machine, and the program is run at the machine.

Still referring to prior methods, at the CNC machine, the torch 24 touches the top of the work piece 44 at P1 (FIG. 7). The torch then rapids to P2 and the torch flame is started. The torch 24 next cuts at a reduced cutting speed cuts from P2 to P9 (or P2', P3', P4, P8, P7, P6, P5, P9 if clockwise consumables are used) to cut the square portion 40 of the hole, with an adjusted cut height set for proper bevel rotation. The torch then turns off, rapids back to P10, and touches the work piece 44 to test the height of the torch 24 from the work piece 44. The torch then re-ignites and tilts to the programmed bevel angle. The torch 24 moves counter-clockwise (or clockwise if clockwise consumables are used) around the circle from P10 back to P10 to cut the conical portion of the hole.

In contrast, according to the present method, a manufacturer who wishes to make a new part with a plow bolt hole need only draw a single shape, such as a circle, in the part using the computer automated drafting program. No second shape (such as a square) needs to be drawn in the CAD program due to special hole recognition parameters within the software that carries out the present method. After the circle is drawn representing the plow bolt hole, the CAD file is used to create a CAM file, where a tool path is assigned by offsetting the torch's cutting path from the bottom geometry of the part work piece 44 within nesting software, which places a number of parts on a single metal sheet. During this step, both the size of the square and the angle of the bevel of a plow bolt hole may be assigned in one operation for all plow bolt holes that are detected in the part. This may be done automatically by the software, or according to inputs from the user, as will be described further herein below. In order to detect which holes are plow bolt holes, the software is provided with special hole recognition parameters and a special tool designation that automatically detects plow bolt holes without affecting programmed cuts for other straight-cut holes.

Figure 9:
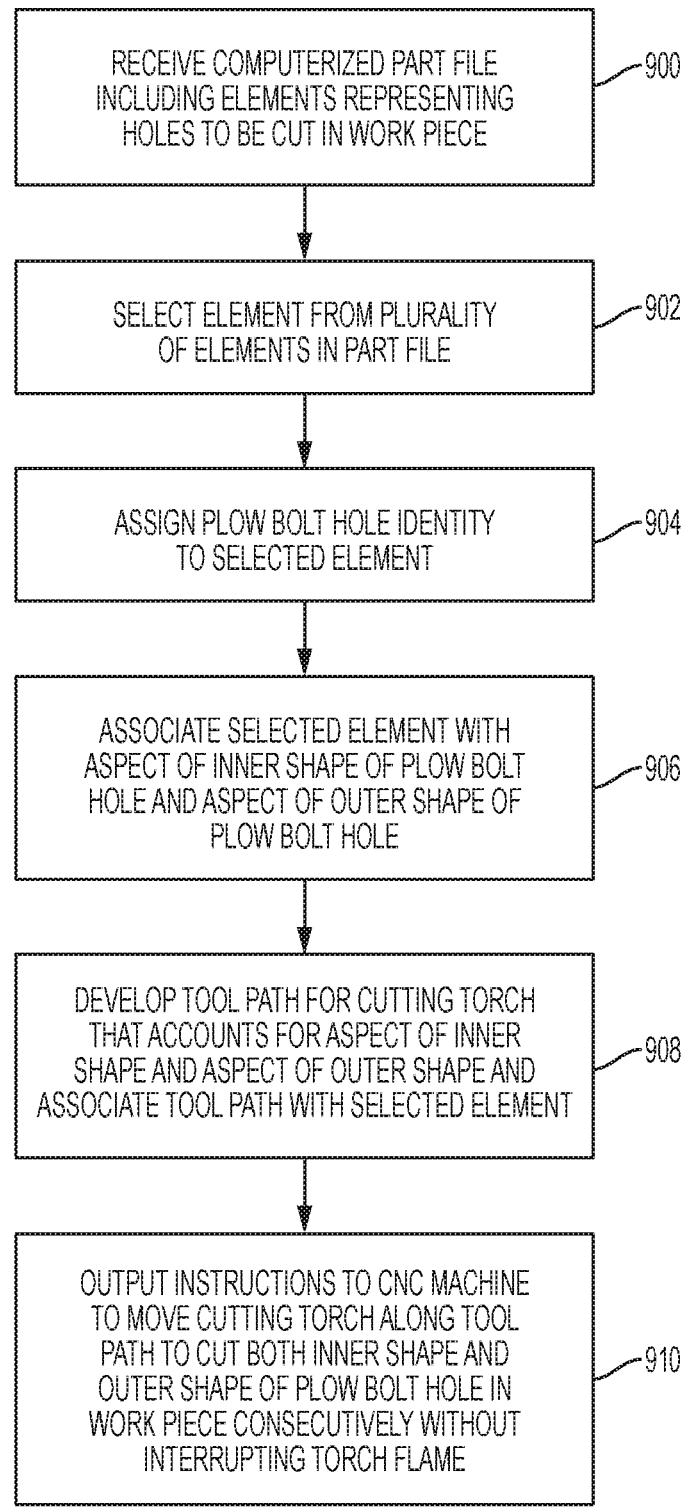
FIG. 9 shows a method for cutting a plow bolt hole according to the present disclosure.

Referring to FIG. 9, a method according to the present disclosure for cutting a plow bolt hole in a work piece 44 using a cutting torch 24 will now be described in further detail. As shown at box 900, the method includes receiving a computerized part file including a plurality of elements representing holes to be cut in the work piece 44. As mentioned above, this computerized part file is a CAD file (e.g., created by a manufacturer) that can be imported into a computing system that executes computer-readable code according to the method described herein to create a CAM file. As shown at box 902, to create the CAM file, the method next includes selecting an element from the plurality of elements in the part file. Selecting an element from the plurality of elements may include one of the following: (1) selecting an element on a particular drawing layer in the part file; (2) selecting an element having a particular shape in the part file; or (3) selecting an element having a particular size in the part file. In any of these cases, for the purposes described herein, the element is a hole drawn in the part that is meant to be cut as a plow bolt hole, although many other elements (such as for example straight-cut holes, corners, etching, notches, etc.) may exist in the part file. It should be noted that more than a single element that is meant to be cut as a plow bolt hole could be selected. For example, the method might include selecting a subset of elements from the plurality of elements in the part file, according to operator choice and/or processor-implemented criteria, as described below.

Regarding option (3), selecting an element having a particular size may include identifying, with a processor, a circular element having a diameter that is between a lower threshold and an upper threshold. For example, the operator of the software can enter parameters for a minimum hole size and a maximum hole size to detect for conversion into a plow bolt hole. If a circle drawn on the part has a hole size that is within the range specified by the minimum diameter and maximum diameter, the software assigns a plow bolt hole tool type to that circle. In other words, if the size of the circle falls between a minimum and a maximum diameter, it is determined to be a plow bolt hole. If the size of the circle falls below the minimum diameter, or above the maximum diameter, it is determined to be a straight-cut hole. In one example, the minimum and maximum hole sizes are defined in terms of thickness-to-diameter ratios, wherein the thickness is a thickness of the work piece and the diameter is a diameter of the circular element. The use of a thickness-to-diameter ratio can be made part of the machine profile so an adjustment does not need to be made for different work piece thicknesses. In one example, a plow bolt hole tool type is assigned if the thickness-to-diameter ratio of a circle drawn in the part is between about 0.375 inches and about 1 inch.

In other examples, the plow bolt hole need not be drawn as a circle with a particular diameter to be detected, but instead could be drawn as just a square or a rectangle, with no circle surrounding it. The software may be programmed to detect the shape of the square or rectangle, and the plow bolt hole tool type may thereafter be assigned to the detected holes. In yet another example, all plow bolt holes can be drawn on a particular drawing layer within the computer automated drafting program. The location of holes on this layer can be singled out by the software program, and the plow bolt hole tool type may be assigned to all objects drawn on this layer. Many other ways to detect a plow bolt hole drawn on the part in the computer automated drafting program can be used, and the examples provided herein are not limiting on the scope of the present disclosure.

In fact, selection of the element need not be done by the processor, but could instead be done by a user interacting with the system. In this instance, selecting an element from the plurality of elements includes manually selecting the element via a user interface in communication with a processor. In this way, the use of separate drawing layers, different sized or shaped holes, etc. can be eliminated, and the user can directly select the holes in the part file that the user wishes to be cut as plow bolt holes.

Next, as shown at box 904, the method includes assigning a plow bolt hole identity to the selected element. In the case that a subset of elements were selected in step 902, the method includes assigning the plow bolt hole identity to each element in the selected subset of elements. This will associate the element(s) with a quality number that has been assigned to a given tool within a quality process mapping module of the machine profile, which will alert the CNC machine to use the plow bolt hole cutting method described herein when the selected element is being cut. Assignment of the plow bolt hole identity can be done either automatically by the processor or manually by the user after all plow bolt holes have been either automatically or manually selected, or after each individual plow bolt hole is selected.

As shown at box 906, the method then includes associating the selected element with an aspect of an inner shape of the plow bolt hole and an aspect of an outer shape of the plow bolt hole, wherein the outer shape circumscribes the inner shape. In the instance where a subset of elements are selected, the method includes associating each element in the selected subset of elements with the aspect of the inner shape of the plow bolt hole and the aspect of the outer shape of the plow bolt hole. According to the present example, the inner shape of the plow bolt hole is a square and the aspect of the square is a size, and the outer shape of the plow bolt hole is a circle and the aspect of the circle is a bevel angle. The square will correspond to the square portion 40 of the plow bolt hole 38 once the hole is cut in the work piece 44, and its size corresponds to the length/width of the square. This dimension can be set by a user via a macro within the software. The circle will correspond to the conical portion 42 of the plow bolt hole 38 once the hole is cut in the work piece 44, and the bevel angle will correspond to the angle A of the conical portion 42 with respect to a front side 41 of the work piece 44 (FIG. 6). This angle A can also be set by a user via a macro within the software. Although the user may be able to set the square size and angle of the plow bolt hole manually, association of the element with the aspects of the inner and outer shapes is preferably performed automatically by the processor for all elements that have been assigned the plow bolt hole identity. Generally, each plow bolt hole will be cut to have the same size. However, if different sized plow bolt holes are needed in the same part, different thickness-to-diameter ratios could be used to indicate different sized holes are to be cut. Based on the particular thickness to diameter ratio, the tool path algorithm would create the correct size of plow bolt hole.

Next, as shown at box 908, the method includes developing a tool path for the cutting torch 24 that accounts for the aspect of the inner shape and the aspect of the outer shape and associating the tool path with the selected element. Developing the tool path for the cutting torch 24 may include developing a lead-in cut to be executed before cutting the square portion 40 and developing a lead-out cut to be executed before cutting the conical portion 42. The tool path thus provides a way for the torch to lead in and lead out of the plow bolt hole to leave a clean hole. The lead-in and lead-out movements of the torch 24 can be input by the user via the same macro as the square size and bevel angle were input. For example, referring back to FIG. 7, the user might indicate via a lead-in macro interface that the first cut into the work piece at P2 should be made at a particular angle (e.g., 90 degrees). The user may then specify that the cut from P2 to P3 should be of a certain length (e.g., X inches). The user may also specify that the curving cut into the square portion 40 of the hole 38 should be made at a particular radius (e.g., Y inches). As mentioned above, via this same macro, the user may also specify the square size (i.e., length of all sides of the square) to be used for cuts from P4 to P5, P6, P7, P8, and P9. A separate lead-out macro interface could be used to specify the length of the cut from P9 to P10 (e.g., Z inches) before the torch 24 is tilted to cut at the bevel angle to form the conical portion 42 of the hole 38. Typically a 40 degree bevel angle will be used, but this value could be variable based on operator input via the macro.

Developing the tool path for the cutting torch 24 also includes offsetting the tool path at a top (front side 41) of the work piece 44 with respect to a bottom (back side 43) of the work piece 44 to account for the bevel angle A, the size of the square, and a thickness T of the work piece 44. Referring to FIG. 6, it should be apparent that the torch 24 needs to be moved outwardly along the X- and Y-axes 92, 90 with respect to the perimeter of the square portion 40 if the torch flame, once the torch is tilted to the bevel angle A, is to cut at the correct position around the square portion 40. Thus, the tool path at the top of the work piece 44 will be wider to account for the bevel.

The method may then include, as shown at box 910, outputting instructions to a computer numerical control (CNC) machine to move the cutting torch along the tool path so as to cut both the inner shape and the outer shape of the plow bolt hole in the work piece consecutively without interrupting a flame of the torch. For example, the part program instructions are loaded at the CNC machine, and the program is run at the CNC machine. According to the program, if the plow bolt hole tool type has been assigned to a particular hole drawn in the part (based on, for example, its thickness-to-diameter ratio, its shape, or its drawing layer), the lead-in and lead-out macros are executed and the following sequence is performed. Referring to FIG. 7, the torch 24 touches the top of the work piece 44 at P1. The torch rapids to P2 and is then started. The torch then cuts at a reduced cutting speed cuts from P2 to P9 (or P2', P3', P4, P8, P7, P6, P5, P9 if clockwise consumables are used) to cut the square portion 40 of the hole, with an adjusted cut height set for proper bevel rotation. Here at P9, instead of turning off the torch as in prior methods, the torch pre-aligns and tilts to the programmed bevel angle A and moves to P10 with the torch tilted and still cutting.

Thus, the method includes outputting instructions to the CNC machine to move the cutting torch along the X- and Y-axes 92, 90 to continuously cut first, second, third and fourth sides of the square portion 40, and outputting instructions to the CNC machine to subsequently rotate the cutting torch about both the C-axis 94 and the A-axis 96 simultaneously to cut the conical portion 42 at the bevel angle A. The torch moves counter-clockwise (or clockwise if clockwise consumables are used) around the circle from P10 back to P10 to cut the conical portion 42 of the hole 38. The conical portion 42 of the hole 38 can be cut according to the bevel cutting method described above with respect to FIGS. 1-3. According to the present disclosure, the method includes outputting instructions to the CNC machine to keep the torch flame on while transitioning from cutting the square portion 40 to cutting the circle 42, so as to drastically reduce cutting time for a plow bolt hole.

Figure 8:
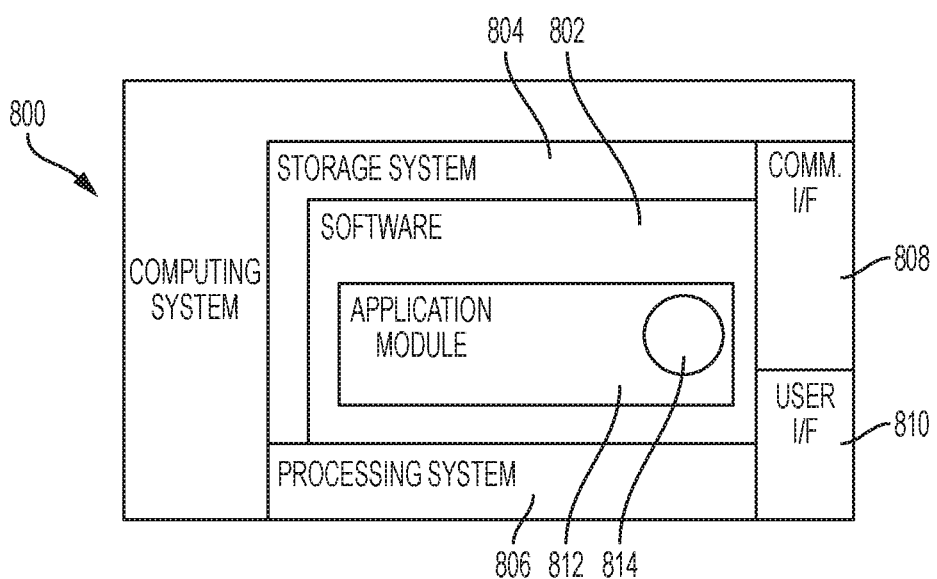
FIG. 8 is a schematic representation of an exemplary computing system for executing the method of the present disclosure.

FIG. 8 is a system diagram of an exemplary embodiment of a system 800 for augmenting a part file with particulars of plow bolt holes to be cut in a work piece. The system 800 is generally a computing system that includes a processing system 806, storage system 804, software 802, communication interface 808 and a user interface 810. The processing system 806 loads and executes software 802 from the storage system 804, including a software application module 812. When executed by the computing system 800, software module 812 directs the processing system 806 to operate as described herein above in further detail, including execution of the plow bolt hole tool module 814.

Although the computing system 800 as depicted in FIG. 8 includes one software module in the present example, it should be understood that one or more modules could provide the same operation. Similarly, while description as provided herein refers to a computing system 800 and a processing system 806, it is to be recognized that implementations of such systems can be performed using one or more processors, which may be communicatively connected, and such implementations are considered to be within the scope of the description.

The processing system 806 can comprise a microprocessor and other circuitry that retrieves and executes software 802 from storage system 804. Processing system 806 can be implemented within a single processing device, but can also be distributed across multiple processing devices or sub-systems that cooperate in existing program instructions. Examples of processing system 806 include general purpose central processing units, applications-specific processors, and logic devices, as well as any other type of processing device, combinations of processing devices, or variations thereof.

The storage system 804 can comprise any storage media readable by processing system 806 and capable of storing software 802. The storage system 804 can include volatile and non-volatile, removable and non-removable media implemented in any method or technology for storage of information, such as computer readable instructions, data structures, program modules, or other data. Storage system 804 can be implemented as a single storage device but may also be implemented across multiple storage devices or sub-systems. Storage system 804 can further include additional elements, such a controller capable of communicating with the processing system 806.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to storage the desired information and that may be accessed by an instruction execution system, as well as any combination or variation thereof, or any other type of storage medium. In some implementations, the store media can be a non-transitory storage media. In some implementations, at least a portion of the storage media may be transitory. It should be understood that in no case is the storage media a propagated signal.

User interface 810 can include a mouse, a keyboard, a voice input device, a touch input device, a motion input device, and other comparable input devices and associated processing elements capable of receiving user input from a user. Output devices such as a video display or graphical display can display an interface further associated with embodiments of the system and method as disclosed herein. Speakers, printers, and other types of output devices may also be included in the user interface 810. Each of these devices allows the user to interact with the computing system 800 to select plow bolt holes, assign plow bolt hole identities, change square size and bevel angle via the macro interfaces, and output instructions to be sent to the CNC machine. In one example, the computing system 800 and thus user interface 810 are located at the CNC machine, for example, at the controller 22. In other examples, the computing system 800 and user interface 810 are located remote from the CNC machine, and instructions from the computing system are sent via the communication interface 808 to the controller 22 of the CNC machine.

The software 802, and the plow bolt hole tool module 814 more specifically, thus are a non-transitory computer readable medium with computer executable instructions stored thereon executed by a processor 806 to perform the method described herein above. As discussed with respect to FIG. 9, this method includes analyzing a computerized part file including a plurality of elements representing holes to be cut in a work piece (box 900); selecting an element from the plurality of elements in the part file (box 902); assigning a plow bolt hole identity to the selected element (box 904); associating the selected element with an aspect of an inner shape of a plow bolt hole to be cut in the work piece and an aspect of an outer shape of the plow bolt hole, wherein the outer shape circumscribes the inner shape (box 906); developing a tool path for a cutting torch that accounts for the aspect of the inner shape and the aspect of the outer shape and associating the tool path with the selected element (box 908); and outputting instructions for a CNC machine to move the cutting torch along the tool path so as to cut both the inner shape and the outer shape of the plow bolt hole in the work piece consecutively without interrupting a flame of the torch (box 910).

Eliminating the step of drawing both circles and squares on the part within the computer automated drafting program saves time preparing the part at the drawing stage. Eliminating the need to separately cut the square and conical portions of the plow bolt hole, and eliminating the need to lift and/or turn off the torch between these steps, allows the CNC machine to perform fewer steps and improves quality by not gouging the part as much. Cutting a plow bolt hole according to the present method also reduces the cycle time, because the torch does not have to stop, align itself for the next cut movement, and then restart.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A method for cutting a plow bolt hole in a work piece using a cutting torch, the method comprising:
   receiving a computerized part file including a plurality of elements representing holes to be cut in the work piece;
   a processor selecting an element having a particular size from the plurality of elements in the part file by identifying a circular element having a diameter that is between a lower threshold and an upper threshold;
   the processor assigning a plow bolt hole identity to the selected element;
   the processor associating the selected element with an aspect of an inner shape of the plow bolt hole and an aspect of an outer shape of the plow bolt hole, wherein the outer shape circumscribes the inner shape;
   the processor developing a tool path for the cutting torch that accounts for the aspect of the inner shape and the aspect of the outer shape and associating the tool path with the selected element; and
   outputting instructions to a computer numerical control (CNC) machine that moves the cutting torch along the tool path according to the instructions so as to cut both the inner shape and the outer shape of the plow bolt hole in the work piece consecutively without interrupting a flame of the cutting torch.

2. The method of claim 1, wherein:
the inner shape of the plow bolt hole is a square and the aspect of the square is a size; and
the outer shape of the plow bolt hole is a circle and the aspect of the circle is a bevel angle.

3. The method of claim 2, wherein:
the cutting torch is moveable along horizontal X- and Y-axes that are perpendicular to one another, rotatable around a vertical C-axis, and rotatable around an A-axis that is angled with respect to the C-axis and with respect to the X- and Y-axes; and
the A-axis is in the same plane as the C-axis and intersects the C-axis at a focal point of the cutting torch.

4. The method of claim 3, further comprising:
outputting instructions to the CNC machine to move the cutting torch along the X- and Y-axes to continuously cut first, second, third and fourth sides of the square; and
outputting instructions to the CNC machine to subsequently rotate the cutting torch about both the C-axis and the A-axis simultaneously to cut the circle at the bevel angle.

5. The method of claim 4, further comprising outputting instructions to the CNC machine to keep the torch flame on while transitioning from cutting the square to cutting the circle.

6. The method of claim 4, wherein developing the tool path for the cutting torch includes developing a lead-in cut to be executed before cutting the square and developing a lead-out cut to be executed before cutting the circle.

7. The method of claim 2, wherein developing the tool path for the cutting torch includes offsetting the tool path at a top of the work piece with respect to a bottom of the work piece to account for the bevel angle, the size of the square, and a thickness of the work piece.

8. A non-transitory computer readable medium with computer executable instructions stored thereon executed by a processor to perform the method of:
analyzing a computerized part file including a plurality of elements representing holes to be cut in a work piece;
selecting an element having a particular size from the plurality of elements in the part file by identifying a circular element having a thickness-to-diameter ratio that is between a lower threshold and an upper threshold, wherein the thickness is a thickness of the work piece and the diameter is a diameter of the circular element;
assigning a plow bolt hole identity to the selected element;
associating the selected element with an aspect of an inner shape of a plow bolt hole to be cut in the work piece and an aspect of an outer shape of the plow bolt hole, wherein the outer shape circumscribes the inner shape;
developing a tool path for a cutting torch that accounts for the aspect of the inner shape and the aspect of the outer shape and associating the tool path with the selected element; and
outputting instructions for a computer numerical control (CNC) machine that moves the cutting torch along the tool path according to the instructions so as to cut both the inner shape and the outer shape of the plow bolt hole in the work piece consecutively without interrupting a flame of the cutting torch.

9. The non-transitory computer readable medium of claim 8, wherein:
the inner shape of the plow bolt hole is a square and the aspect of the square is a size; and
the outer shape of the plow bolt hole is a circle and the aspect of the circle is a bevel angle.

10. The non-transitory computer readable medium of claim 9, wherein:
the cutting torch is moveable along horizontal X- and Y-axes that are perpendicular to one another, rotatable around a vertical C-axis, and rotatable around an A-axis that is angled with respect to the C-axis and with respect to the X- and Y-axes; and
the A-axis is in the same plane as the C-axis and intersects the C-axis at a focal point of the cutting torch.

11. The non-transitory computer readable medium of claim 10, wherein the method further comprises:
outputting instructions to the CNC machine to move the cutting torch along the X- and Y-axes to continuously cut first, second, third and fourth sides of the square; and
outputting instructions to the CNC machine to subsequently rotate the cutting torch about both the C-axis and the A-axis simultaneously to cut the circle at the bevel angle.

12. The non-transitory computer readable medium of claim 11, wherein the method further comprises outputting instructions to the CNC machine to keep the torch flame on while transitioning from cutting the square to cutting the circle.

13. The non-transitory computer readable medium of claim 11, wherein developing the tool path for the cutting torch includes developing a lead-in cut to be executed before cutting the square and developing a lead-out cut to be executed before cutting the circle.

14. The non-transitory computer readable medium of claim 9, wherein developing the tool path for the cutting torch includes offsetting the tool path at a top of the work piece with respect to a bottom of the work piece to account for the bevel angle, the size of the square, and the thickness of the work piece.

15. The non-transitory computer readable medium of claim 8, wherein the method further comprises selecting a subset of elements from the plurality of elements in the part file, assigning the plow bolt hole identity to each element in the selected subset of elements, and associating each element in the selected subset of elements with the aspect of the inner shape of the plow bolt hole and the aspect of the outer shape of the plow bolt hole.

* * * * *